Nov. 3, 1964   F. A. GONZALEZ   3,155,081
ROTARY INTERNAL COMBUSTION ENGINE
Filed Feb. 28, 1961   2 Sheets-Sheet 1
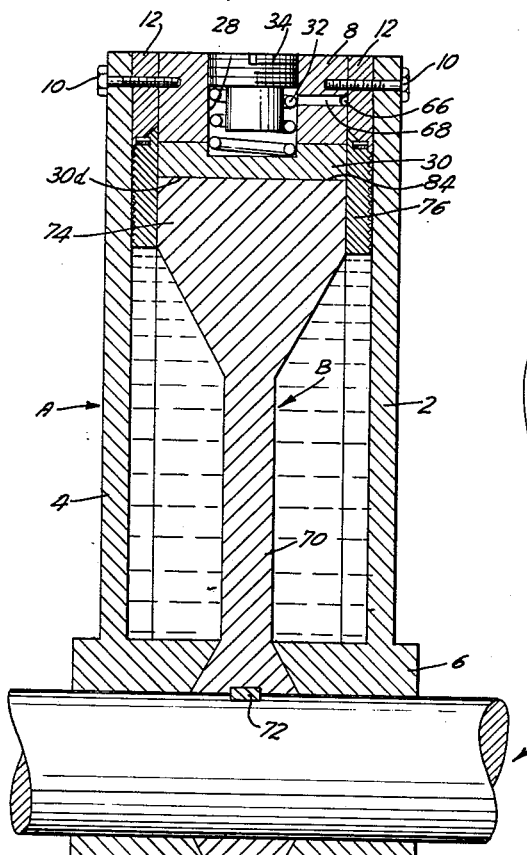
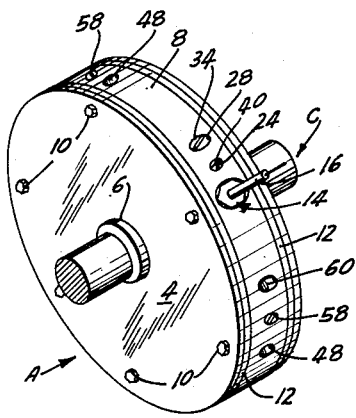
FIG. 1
FIG. 3
INVENTOR.
FRANK A. GONZALEZ
BY
ATTORNEYS Nov. 3, 1964  F. A. GONZALEZ  3,155,081
ROTARY INTERNAL COMBUSTION ENGINE
Filed Feb. 28, 1961  2 Sheets-Sheet 2
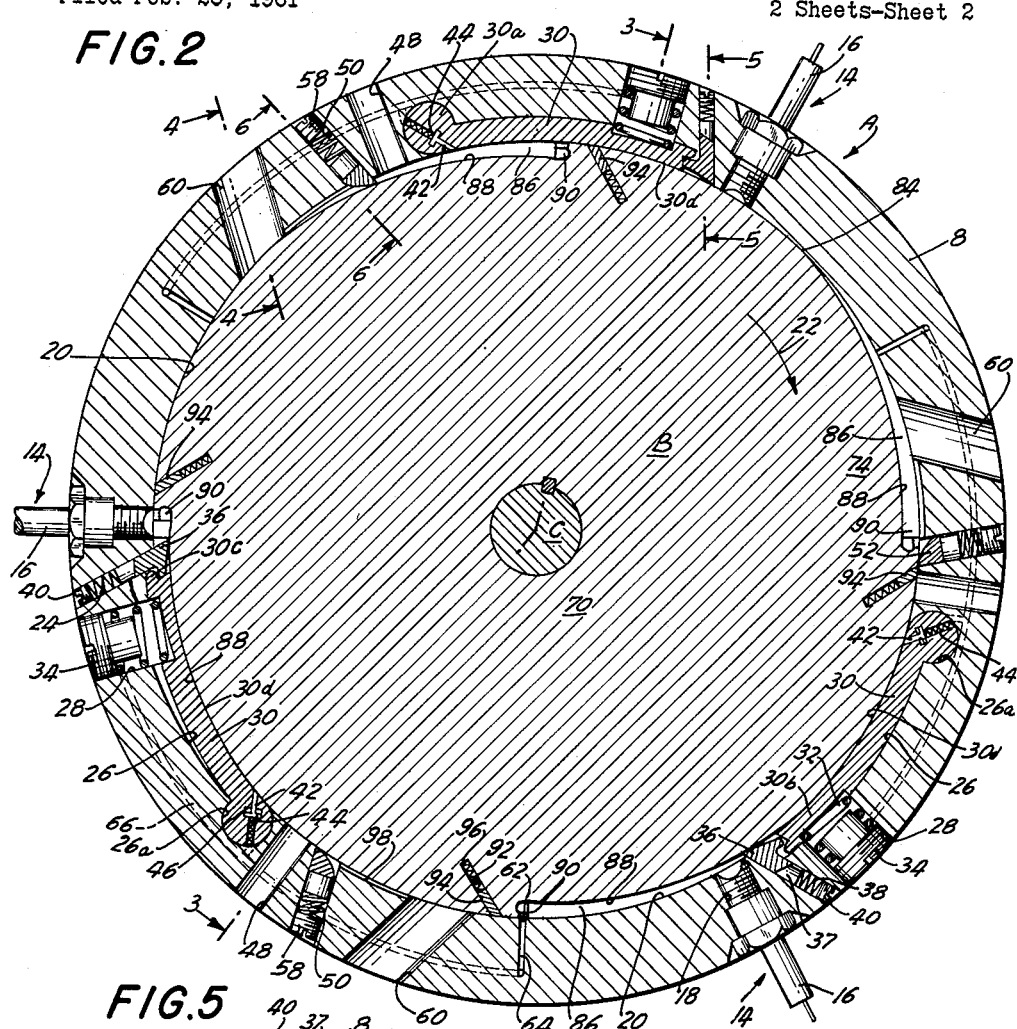
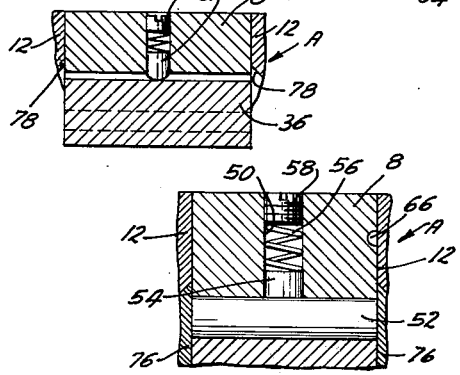
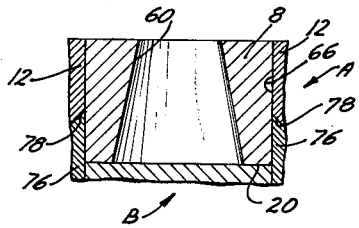
INVENTOR.
FRANK A. GONZALEZ
BY James and Franklin
ATTORNEYS

| United States Patent Office | 3,155,081
Patented Nov. 3, 1964 |

3,155,081
ROTARY INTERNAL COMBUSTION ENGINE
Frank A. Gonzalez, 50 Park Ave., New York, N.Y.
Filed Feb. 28, 1961, Ser. No. 92,304
7 Claims. (Cl. 123—15)

The present invention relates to an internal combustion engine in which the part directly acted upon by the fired gases is rotatable rather than reciprocable, and relates specifically to an arrangement of parts in such a device by means of which improved performance is attained.

Conventional internal combustion engines, whether of the gasoline or diesel fuel type, utilize cylinders within which pistons reciprocate, the reciprocating motion of the pistons being converted to rotary motion by means of cranks and a crank shaft. This motion conversion is known to be undesirable, both from the point of view of its inherent mechanical efficiency and its complexity and expense, but as a practical matter it has nevertheless been accepted in part because of the relative ease with which apparatus of that type achieves high compression of the fuel prior to ignition. The complexity of reciprocating engines of the conventional type is further complicated by the need for actuation of mechanical fuel inlet and exhaust valves in synchronism with the engine.

Internal combustion engine structures have been proposed in which the part directly acted upon by the fired gases itself rotates. These prior art constructions have not proved practical, however, largely because of the fact that the fuel could not be suitably compressed immediately prior to the time of firing. A corollary disadvantage was the difficulty of maintaining within the firing chambers the high pressures engendered by the combustion of the fuel. In addition, they were to a large degree highly complex and composed of a large number of relatively movable parts, thus greatly detracting from such advantages as the rotary engine might otherwise theoretically have over the reciprocating type of engine.

In accordance with the present invention a rotary internal combustion engine has been devised which is simple and sturdy, and utilizes but a small number of relatively movable parts. It is, however, so designed as to produce exceptionally high compression of the fuel in the firing chamber just prior to the instant of firing, and to contain the still higher pressures developed by the combustion of the fuel, so that these pressures are efficiently transformed into movement of the rotor. The arrangement is such that no separate mechanical valves are required in the fuel inlet line or in the exhaust line, the rotation of the rotor moving the firing chamber successively past a fuel inlet port to a firing station and then to an exhaust port. Sealing means are provided to ensure that movement of the firing chamber past the inlet port will suck fuel into the firing chamber, that the combustion gases will remain in the firing chamber and not escape therefrom while they are acting to cause the rotor to rotate, and that the exhaust gases are effectively scavenged from the firing chamber.

When a firing chamber comes into registration with a firing station on the stator, means are provided for constricting the volume of the firing chamber and thus compressing the fuel, while at the same time conveying the fuel to a position in registration with a firing device such as a spark plug. This is accomplished in part by a member articulately mounted on the stator and movable into the firing chamber when that firing chamber comes into registration therewith. High compression is assured by reason of the fact that the lever is forcibly pushed into the firing chamber, a considerable portion of that force being derived from the partially expended exhaust gases produced by combustion at a second firing station. The member, and a sealing plunger associated therewith, not only compress the fuel preparatory to ignition thereof, but also serve to seal the trailing end of the firing chamber after combustion, this causing the high pressure products of combustion to act upon the leading end of the combustion chamber in order to produce rotation of the rotor.

Preferably, the stator is provided with a plurality of firing stations and the rotor is provided with a different plurality of firing chambers, the relative locations of the firing stations and firing chambers being such as to produce a series of time-staggered combustion impulses on the rotor during each single rotation thereof. In this way smooth and efficient operation is accomplished, and exhaust gas pressure is provided at each firing station, deriving from the exhaust gases produced at a different firing station, to assist in compressing the fuel prior to ignition and maintaining a seal at the trailing end of the firing chamber after ignition.

In accordance with the preferred embodiment here disclosed, the firing chambers are provided on a radially outer part of the rotor and another chamber is defined between the rotor and stator at a radially inner portion of the rotor, which other chamber is substantially filled with lubricant, the lubricant being urged outwardly by centrifugal force to lubricate the bearing surfaces without interfering with, and to some extend enhancing, the seal between the rotor and and stator.

The member which compresses the fuel in the firing chamber just prior to ignition should, in order to accomplish this compression to the fullest extent, be shaped in a manner complementary to the shape of the firing chamber. As the rotor moves past its position corresponding to the compression of the fuel, the compression lever will tend to be raised. However, it is at this very time that maintenance of a seal at the trailing end of the firing chamber is most required. Accordingly, in accordance with the present invention the compression member is associated with a sealing plunger which moves down into the firing chamber together with the compression member, that member thereafter moving out of the firing chamber as the rotor rotates while its associated sealing plunger remains in the firing chamber to ensure the maintenance of the desired seal at the training end of that chamber. This sealing plunger is so constructed that the pressure developed in the firing chamber serves to urge it into sealing relation with the rotor, thus producing an exceptionally effective seal against undesired escape of the products of combustion.

To the accomplishment of the above, and to such other objects as may hereinafter appear, the present invention relates to the construction of a rotary internal combustion engine as defined in the appended claims, and as described in this specification, taken together with the accompanying drawings, in which:

FIG. 1 is a three-quarter perspective view of a preferred embodiment of the present invention;

FIG. 2 is a side cross sectional view, on an enlarged scale, of the engine of FIG. 1;

FIG. 3 is a cross sectional view, on an enlarged scale, taken along the line 3—3 of FIG. 2; and FIGS. 4, 5 and 6 are cross sectional views taken respectively along the lines 4—4, 5—5 and 6—6 of FIG. 2.

The engine of the present invention comprises a stator generally designated A within which a rotor generally designated B is rotatably mounted, the rotor being fast on an output shaft generally designated C which extends out beyond the stator A, and which may be drivingly connected to any external device, gearing or linkages, as desired.

The stator A comprises end plates 2 and 4, each provided with a central bearing hub 6 within which the shaft C is journaled. The plates 2 and 4 are secured adjacent their peripheries to a stator ring 8, as by means of the screws 10, bearing rings 12 being interposed between the plates 2, 4 and the ring 8. Equally spaced around the periphery of the ring 8 are a plurality of firing stations generally designated 14, here shown as three in number. In the embodiment here specifically disclosed, which relates to a gasoline type internal type combustion engine, each of these firing stations comprises an ignition device such as a spark plug 16 which sealingly passes through an opening 18 in the ring 8 and which is exposed on the substantially circular inner surface 20 of that ring. Adjacent the opening 18, and located relative thereto in a direction opposite to that in which the rotor B rotates (that direction of rotation being indicated by the arrow 22 in FIG. 2) is an opening 24 and a recess 26 with which opening 28 communicates. A lever-like member 30 (hereinafter sometimes termed the "compression member" for reasons which will become apparent hereinafter) having a width substantially equal to that of the rotor B is housed within the recess 26, its enlarged end 30a being rotatable within the corresponding portion 26a of the recess 26, the lever 30 thus being pivotally mounted. Its forward end 30b extends under the opening 28 and is there engaged by a compression spring 32, the force of which is controlled by screw 34 threadedly and sealingly received within the opening 28. The tip of the lever 30 is provided with a lip 30c which is received over the rearwardly extending portion of a sealing member 36 which extends substantially the full width of the rotor B and which is located beneath the opening 24. A plunger 37 is slidably received within the opening 24, engages the upper surface of the member 36, and is acted upon by compression spring 38 received within the opening 24, the pressure of the spring being controlled by a screw 40 which is threadedly and sealingly received within the opening 24. It will be noted that the opening 24, and the sealing plunger 36, are not truly radially oriented, but are inclined forwardly in the direction of rotation of the rotor B. The pivotally mounted end 30a of the lever 30 may be provided with a sealing strip 42 urged outwardly by means of a spring 44 received within slot 46.

Immediately behind the lever 30 (relative to the direction of the rotor B) is a fuel inlet opening 48, immediately behind which is a forwardly inclined opening 50. A sealing member 52, which extends substantially the full width of the rotor B, is located beneath the opening 50 and has a stub 54 slidably received in the opening 50 and acted upon by compression spring 56, the force of which is controlled by screw 58 threadedly and sealingly received within the opening 50.

Located forwardly of the firing station 14 relative to the direction of rotation of the rotor B is an exhaust opening 60. Located between the exhaust opening 60 and the firing station 14, and also exposed on the inner surface 20 of the ring 8, is a bleed port 62 which connects with vertical passage 64 and peripheral passage 66, the latter being formed in the side wall of the ring 8 and extending to and communicating with the opening 28 by means of the lateral passage 68 (see FIGS. 3, 4 and 6).

The rotor B comprises a web or disk 70 made fast to the shaft C by means of key 72 and extending radially out therefrom to define an outer portion 74 of increased width, to the side surfaces of which portion 74 rings 76 are secured in any appropriate manner, as by welding, the rings 76 extending radially beyond the portion 74 and making bearing engagement with the stator rings 12 along the inclined surfaces 78. Slots may be formed centrally of those bearing surfaces, within which spring rings 80 are received. The outer surfaces of the ring 76 may be knurled or otherwise roughened, as exaggeratedly shown in FIG. 3. A pair of chambers 82 are formed between the radial inner portions of the rotor B and the stator A, and those chambers 82 may be filled, or substantially so, with lubricant, the roughened outer surfaces of the rotor rings 76 preferably having a configuration such as to facilitate the feeding of such lubricant to the bearing surfaces 78, where the lubricant can assist in maintaining a seal at those surfaces.

The radially outer surface 84 of the rotor portion 74 is generally circular and is in close relation to the inner circular surface 20 of the stator ring 8. Formed on the rotor surface 84 are a plurality of recesses 86, here shown as four in number, which define firing chambers. The recesses 86 extend substantially the full width of the rotor part 74. Their bottom surfaces 88 incline inwardly from the generally circular periphery of the rotor part 74 and have the same radius of curvature as the surface 84 but a different center therefrom. The curvature of the bottom surfaces 30d of the levers 30 corresponds to the curvatures of the surfaces 84 and 88. The recesses 86 terminate at their leading ends, relative to the direction of rotor rotation, in undercut recess portions 90 of reduced width.

The rotor portion 74 may be provided, slightly in advance of the recess leading portions 90, with openings 92 inclined outwardly in a direction opposite to that of the rotor rotation, within which openings sealing strips 94 are received, those strips being urged out into engagement with the stator surface 20 by means of compression springs 96.

The fuel inlet openings 48 may be connected by suitable piping and/or manifolds (not shown) to a source of fuel, and the exhaust openings 60 may be connected by suitable piping and/or manifolds (not shown) to an exhaust station, all as is conventional. In addition, the ignition devices 16 may be connected to a distributor or other ignition-control means (not shown), the operation of which is synchronized with rotation of the shaft C.

As disclosed the stator A has three firing stations 14, and the rotor B has four firing chambers 86. Each firing chamber 86, as it passes a firing station 14, has a charge of fuel ignited therein, so that, for a single rotation of the rotor B, there are a total of twelve firing impulses. The location of the firing chambers 86 relative to the firing stations 14 is such that each of these firing impulses is spaced in time from the others.

The mode of operation of the engine can best be understood by considering what takes place as a given firing chamber 86 moves to and then beyond a given firing station 14. As the rotor B rotates, the leading end 90 of the recess 86 passes the sealing member 52 and moves further past the fuel inlet opening 48. The element 52 is pressed by the spring 56 into the recess 86, where it engages the bottom wall 88 of the recess. As the leading end of the recess 86 moves away from the member 52 and beyond the fuel inlet opening 58 a suction effect will be produced which will draw fuel into the recess 86. The sealing member 94 carried by the rotor B will sealingly slide over the inner stator surface 20, enhancing the suction effect produced. As the rotor continues to rotate only a portion of the recess 86 will move beneath the lever 30, so that lever will be retained within the opening 26 against the action of the spring 32. (See the recess 86 at the top of FIG. 2.)

This fuel-charging step will continue until such time as the recess 86 has moved to a position where its leading portion 90 of reduced width has passed beyond the member 36. The lever 30 will be held within the opening 26 by the member 36 for so long as the member 36 is out of registration with the main portion of the recess 86, by reason of the engagement between the lever lip 30c and the rearwardly extending portion of the member 36. Thereafter both the member 36 and the lever 30 are urged inwardly, by the springs 38 and 32 respectively, to the position shown at the firing station 14 on the left-hand side of FIG. 2. The lever 30, in conforming as it does closely to the bottom surface 88 of the recess 86, forces the fuel forwardly past the member 36 into the leading recess portion 90, which is then in registration with the ignition device 16 for the firing station in question. The inclination of the bottom surface of the member 36 ensures that substantially all of the fuel will be thus forced forwardly into the relatively small volume defined by the leading recess portion 90, and the rotor-carried sealing strip 94 just in advance of the recess portion 90 will ensure that the high compression of the fuel thus produced will be maintained.

It is at this moment that the ignition device 16 is actuated, igniting the fuel and therefore causing the pressure within that portion of the recess 86 which leads the sealing member 36 to increase greatly. The thus produced pressure exerted on the sealing member 36 will, because of the inclination of that member, serve to ensure firm and effective seal at the trailing end of the combustion chamber. Similarly, the inclination of the rotor-carried strip 94 will ensure an effective seal at the forward end of the combustion chamber. The pressure of the gases will therefore act effectively and efficiently on the leading surface of the combustion chamber 86, thus giving the rotor B a strong push in its direction of rotation. Rotation of the rotor B past its point of ignition cams the lever 30 upwardly causing its free end to lift from the bottom recess surface 88 (see the lowermost recess 86 in FIG. 2), but the sealing member 36 remains in sealing engagement with the recess surface 88.

As the rotor B continues to rotate the recess 86 will come into registration with the bleed port 62. (See recess 86 at the bottom of FIG. 2.) Preferably this occurs after the main impulse of the expanding gases have been transmitted to the rotor B, but while the gases in the chamber are still at an elevated pressure. That elevated pressure will be transmitted through the passages 64, 66 and 68 to the opening 28 at a different firing station 14. That pressure will act upon the lever 30 at that different firing station 14 and will augment the action of the spring 32 in pressing the lever 30 of that different firing station 14 into the recess 86 with which it is then in registration. This is an important feature of the construction of the present invention, since it ensures that when the lever 30 at a given firing station 14 is to compress the fuel preparatory to ignition thereof, it will have sufficient force exerted thereon to reliably accomplish a high degree of compression. The pressure developed in the opening 28 will also serve to prevent undesired escape of the fuel past the lever 30.

As the rotor B continues to rotate the recess 86 moves past the exhaust opening 60, and the exhaust gases escape therethrough (see the recess 86 at the right hand side of FIG. 2). Entry of the sealing member 52 into the recess 86, when the leading end of that chamber proper comes into registration therewith, and the sealing engagement of that member 52 with the bottom recess 88 serves to sweep the exhaust gases into the exhaust opening 60 and to separate the exhausting portion of the recess 86 behind the member 52 from the fuel-intake portion of the recess 86 in advance of the member 52. A passage 98 is formed in the inner stator ring surface 20 between the member 52 and the exhaust opening 60, so that complete scavenging of exhaust gases from the chamber 86 is effected.

As the rotor B rotates, the oil or other lubricant in the chambers 82 is rotated thereby, and is therefore urged outwardly by centrifugal force, thus providing a self-lubricating and a sealing action for the bearing surfaces between the rings 76 and the stator side plates 2 and 4, the surfaces 78 between the rings 76 and the rings 12, and the engaging surfaces of the rings 76 and the stator ring 8.

By reason of the arrangement of parts disclosed it is possible to obtain high compression of the fuel prior to ignition and to contain the much higher pressures produced when the fuel is ignited, so that effective ignition and an efficient transformation of force from the expanding ignited fuel into rotary movement of the rotor are accomplished. The utilization of the ignited fuel at one firing station to produce high compression of fuel before ignition at another firing station, by means of the bleed port 62 and passages 64—68, permits the attainment of high compression with a simplified structure and without having to employ excessively large or heavy parts. The overall structure is therefore relatively simple, light and inexpensive, but it nevertheless produces greatly improved characteristics of operation.

While the engine of the present invention has been here disclosed specifically in a form suitable for use with gasoline type fuels, with which conventional spark plugs 16 are employed, it will be apparent that the device is also applicable for use in diesel-type fuels where a different type of ignition device 16 may be employed, or where reliance may be placed solely upon compression of the fuel to produce ignition with no special ignition device being provided.

While but a single embodiment of the present invention has been here disclosed, it will be apparent that many variations may be made, all within the scope of the invention as defined in the following claims.

I claim:

1. In a rotary internal combustion engine comprising a stator and a rotor rotatable relative thereto, said stator having a plurality of firing station, said rotor having a plurality of separated recesses defining firing chambers movable into registration with said firing stations, means for supplying a combustible mixture to said firing chambers and for exhausting products of combustion therefrom, said stator having compression parts adjacent corresponding firing stations and movable into said rotor recesses when the latter are in registration with the corresponding firing stations for compressing said mixture in said recesses; the improvement which comprises gas-communication means in said stator, operatively connected between a given compression part and an inlet station on said stator displaced in the direction of rotation of said rotor from and in communication with a firing station other than the one corresponding to said given compression part, for causing exhaust gases from said other firing station to urge said given compression part toward said rotor.

2. The engine of claim 1, said means for exhausting products of combustion comprising exhaust ports in said stator displaced in the direction of rotation of said rotor from and in communication with their corresponding firing stations, said inlet station being located between said other firing station and the exhaust part corresponding thereto.

3. The engine of claim 2, in which the recesses on said rotor are so located thereon relative to one another and to said firing stations that when a given recess is in firing position relative to a first firing station, a second recess has moved past its firing position relative to a second firing station, said inlet station associated with said gas-communication means for said first firing station being then in registration with said second recess.

4. The engine of claim 1, in which the recesses on said rotor are so located thereon relative to one another and to said firing stations that when a given recess is in firing position relative to a first firing station, a second recess has moved past its firing position relative to a second firing station, said inlet stations associated with said gas-communication means for said first firing station being then in registration with said second recess.

5. A rotary internal combustion engine comprising a stator, a rotor rotatable relative thereto and having a plurality of separated recesses defining firing chambers thereon, means for supplying a combustible mixture to said firing chambers and for exhausting products of combustion therefrom, said stator having, spaced therealong in the direction of rotation of said rotor and on a surface thereof facing said rotor, a first firing station including a first compression part movable toward said rotor and into a recess for compressing said mixture in said recess, an exhaust port for said first firing station, a second firing station including a second compression part movable toward said rotor and into a recess for compressing said mixture in said recess, said means for exhausting products of combustion comprising an exhaust port for said second firing station, and said stator having a gas-communication passage in communication with and operatively extending between the side of said second compression part remote from said rotor and a part of said rotor-facing stator surface located between said first firing station and said exhaust port therefor.

6. A rotary internal combustion engine comprising a stator, a rotor rotatable relative thereto and having a plurality of separated recesses defining firing chambers thereon, means for supplying a combustible mixture to said firing chambers and for exhausting products of combustion therefrom, said stator having, spaced therealong in the direction of rotation of said rotor and on a surface thereof facing said rotor, a first firing station including a first compression part movable toward said rotor and into a recess for compressing said mixture in said recess, an exhaust port for said first firing station, a second firing station including a second compression part movable toward said rotor and into a recess for compressing said mixture in said recess, said means for exhausting products of combustion comprising an exhaust port for said second firing station, resilient means active on said compression parts to urge them toward said rotor, and said stator having a gas-communication passage in communication with and operatively extending between the side of said second compression part remote from said rotor and a part of said rotor-facing stator surface located between said first firing station and said exhaust port therefor.

7. A rotary internal combustion engine comprising a stator having a generally circular inner surface, a rotor rotatable relative thereto and having a generally circular surface facing said stator surface and having a recess formed therein to define a firing chamber, said stator having, independently mounted thereon and sequentially spaced along said inner surface in the direction of rotation of said rotor, a fuel inlet port, a compression part surface movable toward and into said recess, and a second part surface movable toward and into said recess, and means operatively connecting said compression part and said second part for preventing movement of said compression part surface toward said rotor without corresponding movement of said second part surface and permitting movement of said compression part surface away from said rotor independently of said second part surface.

References Cited in the file of this patent

UNITED STATES PATENTS

| | | |
|---|---|---|
| 883,324 | MacLean | Mar. 31, 1908 |
| 1,315,897 | Aber | Sept. 9, 1919 |
| 1,918,174 | Berggren | July 11, 1933 |
| 2,055,137 | Sherman | Sept. 22, 1936 |
| 2,175,265 | Johnson | Oct. 10, 1939 |
| 2,242,231 | Cantoni | May 20, 1941 |
| 2,273,025 | Dillstrom | Feb. 17, 1942 |
| 2,583,633 | Cronin | Jan. 29, 1952 |
| 2,939,438 | Bush | June 7, 1960 |
| 2,990,820 | Saijo | July 4, 1961 |

FOREIGN PATENTS

| | | |
|---|---|---|
| 547,877 | France | Oct. 5, 1922 |
| 635,754 | Germany | Sept. 23, 1936 |